United States Patent
Maymandi Nejad et al.

(10) Patent No.: US 12,276,502 B2
(45) Date of Patent: Apr. 15, 2025

(54) CONTINUOUS MONITORING OF GYROSCOPE SENSOR FORCED-TO-REBALANCE LOOP ELECTRONICS

(71) Applicant: Panasonic Intellectual Property Management Co., Ltd., Osaka (JP)

(72) Inventors: Mohammad Maymandi Nejad, Hopkinton, MA (US); Ronald J. Lipka, Northborough, MA (US)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 421 days.

(21) Appl. No.: 17/821,849

(22) Filed: Aug. 24, 2022

(65) Prior Publication Data
US 2024/0068812 A1  Feb. 29, 2024

(51) Int. Cl.
*G01C 19/5776* (2012.01)
*H04B 1/04* (2006.01)

(52) U.S. Cl.
CPC ....... *G01C 19/5776* (2013.01); *H04B 1/0458* (2013.01); *H04B 2001/0408* (2013.01)

(58) Field of Classification Search
CPC .............. G01C 19/5776; H04B 1/0458; H04B 2001/0408
See application file for complete search history.

(56) References Cited

U.S. PATENT DOCUMENTS 10,837,796 B2  11/2020  Painter et al.
2015/0122022 A1 *  5/2015  Maki .................. G01C 19/5614
                                                              73/504.16

FOREIGN PATENT DOCUMENTS

EP        3457088 A1 *  3/2019  ............. G01D 3/036

* cited by examiner

Primary Examiner — David S Huang
(74) Attorney, Agent, or Firm — McDonald Hopkins LLC

(57) ABSTRACT

A gyro sensor circuit includes a gyro sensor generating an RF sensing signal according to an angular movement, an RF sense path configured to receive and process the RF sensing signal. The RF sense path comprises a first chopper configured to chop the RF signal at a first chopping frequency to generate a chopped signal, and a demodulator configured to mix the chopped signal with an LO signal to output a baseband signal. The circuit further includes a feedback loop comprising a chopper re-modulator configured to chop and modulate the baseband signal at a frequency of the LO signal, a first amplifier configured to amplify the modulated feedback signal, and a test voltage monitor configured to extract a component corresponding to the LO signal from the modulated feedback signal, and compare a voltage of the extracted component with an expected value determined based on a gain of the first amplifier.

20 Claims, 3 Drawing Sheets

CONTINUOUS MONITORING OF GYROSCOPE SENSOR FORCED-TO-REBALANCE LOOP ELECTRONICS

TECHNICAL FIELD

The present disclosure relates to gyro sensor circuits for continuously monitoring the electronic components in a forced-to-rebalance forward path and feedback path for their functionality and accuracy, to ensure high performance of the closed loop forced-to-rebalance system.

BACKGROUND

Gyroscope sensors often employ a forced-to-rebalance (FTR) feedback loop to remove the sensitivity of the system gain and linearity to the gyroscope gain, quality factor (Q), and linearity, and to extend the system's bandwidth beyond that of the open loop gyroscope.

With the FTR feedback loop, the feedback electronics control the end-to-end gain and linearity much better than an open loop sensing architecture.

The sensitivity of gyroscopes is normally calibrated by the gyroscope supplier using a known sequence of rotary stimuli. The sensitivity, however, is dependent on a number of electromechanical properties that are strain sensitive and/or change over the life of the gyroscope. As a result, the sensitivity shifts after installation of the gyroscope into the end-user's system or drifts over the life of the gyroscope. Because the true input stimuli into the gyroscope after installation are not observable, it is difficult to conveniently recalibrate the sensitivity of the gyroscope when the gyroscope is deployed in the field.

While this FTR feedback method has the advantage of including the gyroscope in the system monitoring, it has inaccuracies or false alarm problems if there is an external rotation or other disturbance that occurs while the test signal is applied if the disturbance is at the same or a nearby frequency to the test signal. Hence, there is a need for the technique for continuous monitoring without being affected by external mechanical or electrical disturbances to the gyroscope sensor.

SUMMARY

One object of this disclosure is to provide gyro sensor circuits for continuously monitoring the electronic components in the FTR loop for their functionality and accuracy, to ensure high performance of the closed loop FTR system.

The gyro sensor circuits with a continuous monitoring capacity can avoid the issue of passing a test signal through the gyroscope, which may not work properly if there are external signals or undesired disturbances present at the same frequency as the test signal.

In one aspect, a gyro sensor circuit includes a gyro sensor generating an RF sensing signal according to an angular movement of the gyro sensor, a radio frequency (RF) sense path configured to receive and process the RF sensing signal. The RF sense path comprises a first high-gain low-noise RF amplifier, a first chopper comprising a chopping switch, and configured to chop the RF signal at a first chopping frequency to generate a chopped signal, and a demodulator coupled with a local oscillator (LO) generating a LO signal, the demodulator configured to mix the chopped RF signal with an LO signal to output a baseband signal. The circuit further includes a feedback loop configured to feed back the baseband signal to the gyro sensor, the feedback loop comprising a connection path configured to connect the LO oscillator to the feedback loop to be used for re-modulating the baseband signal to the RF frequency band, a second amplifier acting to amplify the baseband signal, a combined chopper/re-modulator configured to chop and modulate the baseband signal at a frequency of the LO signal to generate a modulated feedback signal, a third amplifier configured to amplify the modulated feedback signal to drive the gyro electrodes, and a test voltage monitor configured to extract the dc component from the modulated feedback signal, and compare a voltage of the extracted component with an expected value determined based on a gain of the third amplifier.

The RF sense path may further comprise a fourth amplifier configured to amplify the baseband signal, a chopper configured to chop the amplified baseband signal at a chopping frequency, an analog-to-digital converter (ADC) configured to sample the amplified baseband signals for digitization.

The first amplifier and third amplifier may be transimpedance amplifiers.

The second amplifier and fourth amplifier may be transconductance amplifiers.

In another aspect, a gyro sensor circuit includes a gyro sensor generating an RF sensing signal according to an angular movement of the gyro sensor, and an RF sense path configured to receive and process the RF sensing signal. The RF sense path comprises a DC current generator configured to generate test DC current, a first chopper configured to chop the DC current at a first chopping frequency and provide a chopped test current to the RF sense path, in which the chopped test current and the RF sensing signal are combined into a combination signal, a first amplifier configured to amplify the combination signal, a second chopper configured to chop the combination signal at a second chopping frequency to output a chopped combination signal, a demodulator comprising an RF section and an LO section where a pair of resistors separates the two sections, a test voltage monitor configured to extract a component corresponding to test DC current from the chopped combination signal across the pair of resistors, and compare a voltage of the extracted component with an expected value determined based on a gain of the first amplifier, the LO section of the demodulator is configured to mix the shifted combination signal and the LO signal to generate a demodulated signal, the demodulator is also comprising a baseband filter configured to receive the demodulated signal and pass a bandpass signal.

The first chopper and the second chopper may be configured to conduct a chopping operation at a same chopping frequency.

The gyro sensor circuit may further comprise a feedback loop configured to feed back the baseband signal to the gyro sensor, the feedback loop comprising a chopper-modulator combination configured to chop the baseband signal to output a modulated baseband signal.

The feedback loop may further comprise a third amplifier configured to amplify the modulated baseband signal.

The RF sense path may further comprise a fourth amplifier configured to amplify the baseband signal, a fourth chopper configured to chop the amplified baseband signal at the second chopping frequency, and an analog-to-digital converter (ADC) configured to sample the amplified baseband signals for digitization.

In yet another aspect, a gyro sensor circuit comprises a gyro sensor generating an RF sensing signal according to an angular movement of the gyro sensor, an RF sense path configured to receive and process the RF sensing signal. The RF sense path includes a first chopper comprising a chopping switch, and configured to chop the RF signal at a first chopping frequency to generate a chopped signal, a demodulator comprising an RF section and an LO section, a connection path configured to add an LO signal generated by an LO oscillator to the chopped RF signal, which produce a combination signal, an LO mixer configured to mix the combination signal and the LO signal to generate a demodulated signal, and a baseband filter configured to receive the demodulated signal and pass a bandpass signal, and a feedback loop configured to feed back the baseband signal to the gyro sensor, the feedback loop comprising a first amplifier configured to amplify the baseband signal to output amplified baseband signal, a test voltage monitor configured to extract a component corresponding to the LO signal from the demodulated feedback signal, and compare a voltage of the extracted component with an expected value determined based on a gain of the first amplifier, and a second chopper-modulator combination configured to chop the baseband signal at a second chopping frequency to output a modulated baseband signal.

The RF sense path may further comprise a second amplifier configured to amplify the RF sensing signal.

The RF sense path may further comprise a third amplifier configured to amplify the baseband signal to output an amplified baseband signal, a third chopper configured to chop the amplified baseband signal at the first chopping frequency, and an analog-to-digital converter (ADC) configured to sample the amplified baseband signals to output a digitized baseband signal.

The RF sense path may further comprise a digital signal processor (DSP) to analyze the digitized baseband signal.

The DSP comprises a digital filter configured to extract a desired signal from the digitized baseband signal, and an amplitude detector configured to measure the amplitude of the desired signals.

The feedback loop may further comprise a fourth amplifier configured to amplify the modulated baseband signal.

The first and second amplifiers may be transconductance amplifiers, and the third and fourth amplifiers may be a transimpedance amplifier.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, coupled to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
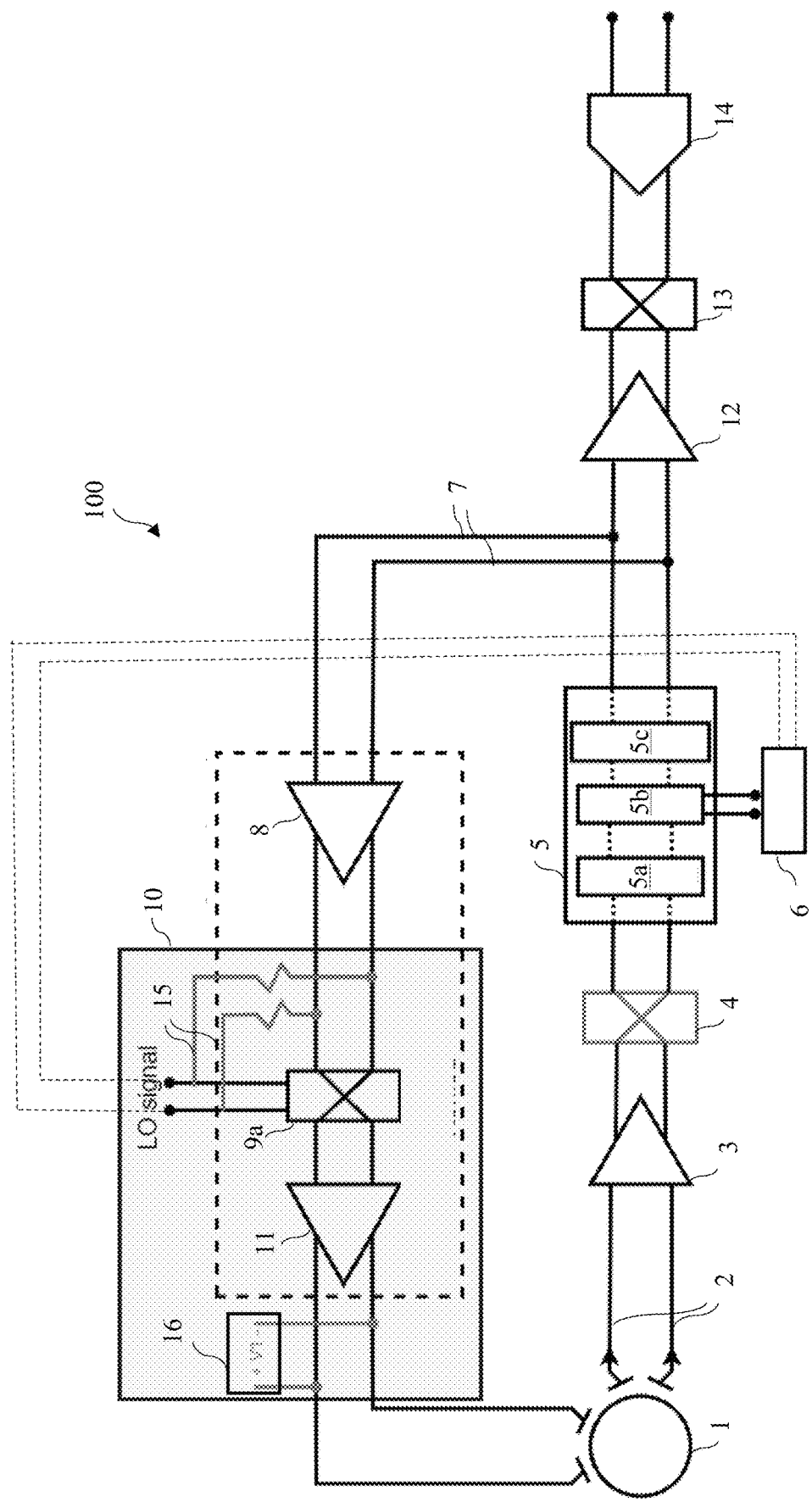
FIG. 1 illustrates a gyroscope sensor circuit for monitoring components in an FTR feedback loop, according to one embodiment of the present disclosure.
Figure 2:
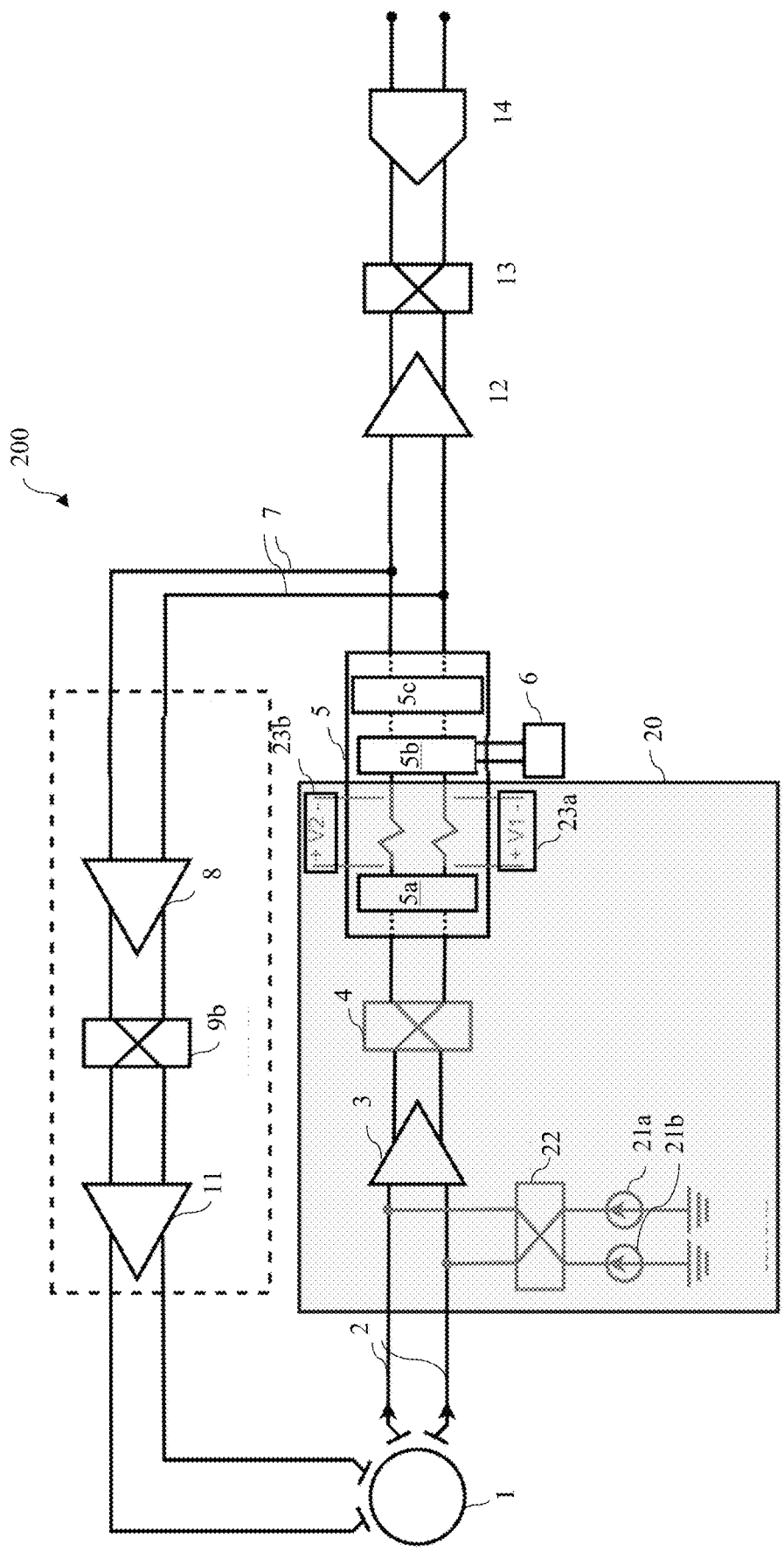
FIG. 2 illustrates a gyroscope sensor circuit for monitoring components in an RF sense path, according to one embodiment of the present disclosure.
Figure 3:
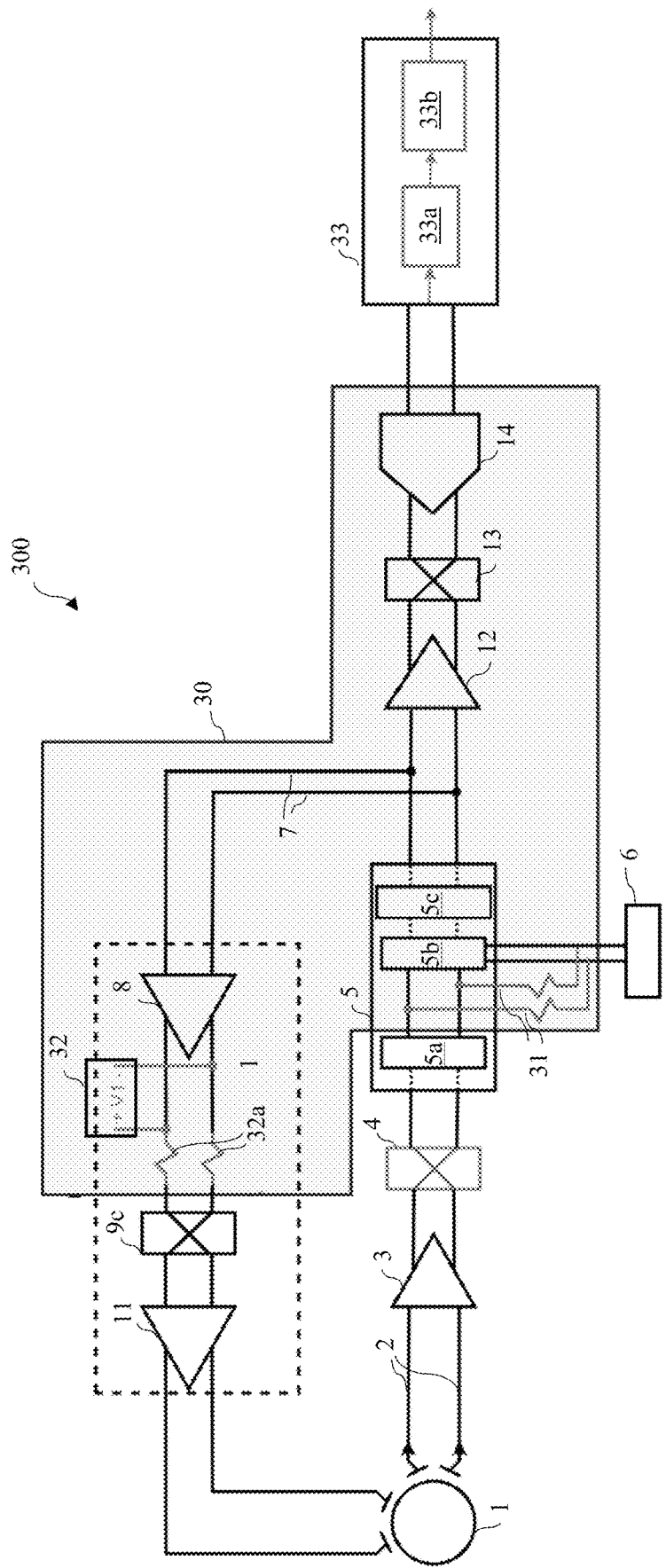
FIG. 3 illustrates a gyroscope sensor circuit for monitoring the baseband components of the FTR feedback loop and RF sense path, according to one embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. The following description with reference to the accompanying drawings is provided to assist in a comprehensive understanding of various embodiments of the present disclosure as defined by the claims and their equivalents. It includes various specific details to assist in that understanding but these are to be regarded as mere examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

It should be apparent to those skilled in the art that the following description of various embodiments of the present disclosure is provided for illustration purpose only and not for the purpose of limiting the present disclosure as defined by the appended claims and their equivalents.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or a combination thereof, but do not preclude the presence or addition of one or more other features, numbers, steps, operations, components, elements, or combinations thereof.

FIG. 1 illustrates gyroscope sensor circuit 100 for monitoring components in a forced-to-rebalance (FTR) feedback loop, according to one embodiment of the present disclosure. In particular, gyroscope sensor circuit 100 monitors blocked region 10 in FTR feedback loop 7.

Gyroscope sensor circuit 100 comprises gyro sensor 1, RF sense path 2 for processing RF sensing signals generated from gyro sensor 1, and FTR feedback loop 7 for feeding a portion of RF sensing signals back to the gyro sensor 1.

RF sense path 2 may include gyro sensor 1, first amplifier 3, first chopper 4, and demodulator 5. RF sense path 2 may further include fourth amplifier 12, second chopper 13, and ADC 14.

Initially, when gyro sensor 1 moves with angle velocities in different directions, gyro sensor 1 generates RF signals according to the angular movements. Then, the generated RF signals are received by RF path 2, which then are amplified at amplifier 3.

The amplified RF signals are coupled to first chopper 4 which comprises a set of chopping switches to generate a chopped version of RF signals at the first chopping frequency f_chp1. The chopped RF signals are supplied to demodulator 5 which comprises RF section 5a, LO mixer section 5b and baseband filter section 5c.

RF section 5a includes an RF input transistor to provide a certain gain to the RF signal. In some embodiment, the gain of RF input transistor does not need to have a certain value and may not be critical to the performance of the system. LO oscillator 6 generates local oscillator signals (LO signals) having the LO frequency, and is supplied to LO mixer section 5b that compromises LO switching transistors needed for mixing operation.

LO mixer section 5b receives local oscillator signals (LO signals) having the LO frequency, which are generated from an LO oscillator 6. Subsequently, LO mixer section 5b multiplies the chopped combination signals by LO signals, which generates demodulated RF and baseband signals.

Baseband filter section 5c includes a lowpass filter for removing the unwanted signals from the band occupied at a given instant by the modulated RF signals. As a result, demodulator 5 outputs baseband signals that passed the lowpass filter in baseband filter section 5c.

As shown in FIG. 1, FTR feedback loop 7 is branched off from the RF sense path 2 at the output of demodulator 5, and feeds the baseband signal back to the gyro sensor 1 with a certain gain/attenuation. The baseband signals branched off from the RF sense path to FTR feedback loop 7 is amplified at amplifier 8. FTR feedback loop 7 may further include chopper re-modulator 9a coupled with the LO oscillator, third amplifier 11, and test voltage monitor 16.

In one embodiment, amplifier 11 is a transimpedance amplifier (TIA), and amplifier 8 and amplifier 12 are transconductance amplifiers (gm-cells).

In the FTR feedback loop 7, connection path 15 is disposed between amplifier 8 and chopper re-modulator 9a, and connects the LO oscillator 6 to the feedback loop 7. The connection path 15 can include resistors and provide the LO signals as output test voltages. The LO signals are combined into the baseband signals, and the combination signals are supplied to chopper re-modulator 9a.

Chopper re-modulator 9a modulates the combination signals into a high frequency band by chopping the combination signals at a frequency of the LO signals. The modulated signals are amplified at amplifier 11 and then are fed back to gyro sensor 1.

FTR feedback loop 7 further includes test voltage monitor 16 which comprises a lowpass filter so as to extract the DC component of the combination signal, corresponding to the LO signals injected to the input of the chopper re-modulator via path 15. Test voltage monitor 16 further includes a comparator to compare a voltage of the extracted DC component with an expected value that is determined based on a gain of chopper re-modulator 9a and a gain of amplifier 11. Thus, test voltage monitor 16 can continuously check the electronic components of the FTR feedback loop block 10 to determine if their performance deviates from their target value. Once an excessive deviation is detected, test voltage monitor 16 can output a notification signal indicating the excessive deviation to an electronic system that is connected to gyroscope sensor circuit 100.

Back to the RF sense path, the baseband signals are amplified by amplifier 12, and then are chopped by second chopper 13 at the second chopping frequency.

If the first and second chopping frequencies are chosen to be the same, the desired gyro signal would be at DC after passing through the second chopper 13, where it is supplied to analog-to-digital converter (ADC) 14 which samples the amplified baseband signals for digitization.

ADC 14 may be implemented with known converter circuits which generate the digital approximation of the analog signals being sampled at a certain sampling frequency.

FIG. 2 illustrates gyroscope sensor circuit 200 for monitoring components in RF sense path 2, according to one embodiment of the present disclosure. In particular, gyroscope sensor circuit 200 monitors the blocked region 20 in RF sense path 2.

Similar to FIG. 1, gyroscope sensor circuit 200 comprises gyro sensor 1, RF sense path 2, and FTR feedback loop 7. The repetitive descriptions of the same components will be omitted for brevity.

RF sense path 2 may include gyro sensor 1, amplifier 3, chopper 4, and demodulator 5 comprising RF section 5a, LO mixer section 5b and baseband filter section 5c. RF sense path 2 further includes DC current generator 21a, 21b prior to amplifier 3, and test voltage monitor 23a and 23b connected, for example, at resistors disposed between RF section 5a and LO mixer section 5b.

As described above, gyro sensor 1 generates RF signals according to angular movements in different directions. Also, DC current generators 21a, 21b generate test DC currents, and supply the test DC currents to first chopper 22. Then, chopper 22 chops the DC currents at a first chopping frequency and provides chopped test DC currents to RF sense path 2, in which the chopped test DC currents and the RF sensing signal are combined into a combination signal.

First amplifier 3 amplifies the combination signal, and provides the amplified signal to chopper 4, which chops the combination signal at the first chopping frequency, and outputs a chopped combination signal. In other words, chopper 4 and chopper 22 conduct a chopping operation at the same chopping frequency, and therefore, the corresponding test signal will be residing at DC in the frequency domain.

Demodulator 5 comprises RF section 5a, LO mixer section 5b and baseband filter section 5c. Test voltage monitors 23a, 23b are disposed between RF section 5a and LO mixer section 5b.

Test voltage monitors 23a, 23b extract respective components (DC) corresponding to the test DC currents from the chopped RF signals, and compare the voltage of the extracted components with an expected value determined based on a gain of amplifier 3 and the value of the test DC currents 21a and 21b.

LO mixer section 5b multiplies the chopped combination signals by LO signals to output demodulated signals. Baseband filter section 5c receives the demodulated signals, and passes baseband signals through a lowpass filter. Note that the desired gyro signal is at the first chopping frequency at the output of the demodulator 5.

FTR feedback loop 7 is branched off from the RF sense path 2 at the output of demodulator 5, which feeds the baseband signals back to the gyro sensor 1 with some gain/attenuation. The branched baseband signals are amplified at amplifier 8 to output feedback signals. FTR feedback loop 7 may further include third chopper re-modulator combination 9b for chopping and modulating the feedback signals back to the RF frequency of the gyro sensor 1, and amplifier 11 for amplifying the feedback signals before being fed back to the gyro sensor 1.

RF sense path 2 can further include amplifier 12 for amplifying the chopped baseband signals, and chopper 13 for chopping again at a second chopping frequency. If the first chopping frequency and the second chopping frequency are the same, then the desired gyro sensor signal would be at DC in the frequency domain. The RF sense path 2 can additionally include ADC 12 for sampling the amplified baseband signals for digitization.

In one embodiment, amplifier 11 is a transimpedance amplifier (TIA), and amplifier 8 and amplifier 12 are transconductance amplifiers (gm-cells).

FIG. 3 illustrates gyroscope sensor circuit 300 for monitoring the baseband components of the FTR feedback loop 7 and RF sense path 2, according to one embodiment of the present disclosure. In particular, the blocked region 30 extended over the FTR feedback loop 7 and RF sense path 2 of the gyroscope sensor circuit 300 is monitored.

Similar to FIGS. 1 and 2, gyroscope sensor circuit 300 comprises gyro sensor 1, RF sense path 2, and FTR feedback loop 7. The repetitive descriptions of the same components will be omitted for brevity.

RF sense path 2 includes gyro sensor 1, amplifier 3, first chopper 4, and demodulator 5, and FTR feedback loop 7 includes second amplifier 8, second chopper 9c and amplifier 11. In addition, connection path 31 is added to connect LO oscillator 6 to demodulator 5 in RF sense path 2, and test voltage monitor 32 is added in FTR feedback loop 7.

In specific, connection path 31 is disposed between RF section 5a and LO mixer section 5b in demodulator 5. The connection path 31 can include resistors and couple LO signals to provide output test voltages to the chopped RF signals, which produces combination signals.

Subsequently, LO mixer section 5b multiplies the combination signals by LO signals, which generates baseband signals. Baseband filter section 5c includes a lowpass filter to pass baseband signals. At the output of demodulator 5 the test signal will be at DC while the gyro signal will be at the first chopping frequency.

In FTR feedback loop 7, baseband signals are branched off from the RF sense path 2 at the output of demodulator 5, and are amplified by amplifier 8. The amplified baseband signals are chopped by second chopper 9c at the first chopping frequency, and then are amplified at amplifier 11 before being fed back to gyro sensor 1.

Test voltage monitor 32 is connected, for example, at resistors 32a disposed between second amplifier 8 and second chopper 9c. Test voltage monitor 32 may comprise a lowpass filter so as to extract the DC component corresponding to the test signals injected through path 31. Test voltage monitor 32 may compare the voltage of the extracted components with an expected value determined based on a gain of amplifier 8 and the LO mixer section of the demodulator 5.

The RF sense path 2 may further include fourth amplifier 12, second chopper 13, and ADC 14. The RF sense path 2 may also include a digital signal processor (DSP) 33 to analyze the digitized baseband signals. As an example, the DSP includes digital filter 33a to extract desired signals and amplitude detector 33b to measure the amplitude of the desired signals. In one embodiment, DSP 33 extracts the DC component corresponding to the gyro signal and the component at the first chopping frequency corresponding to the LO signals provided as the output test voltages and compares the extracted test voltage with an expected value determined based on a gain of amplifier 11.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A gyro sensor circuit, comprising:
 a gyro sensor generating a radio frequency (RF) sensing signal according to an angular movement of the gyro sensor,
 an RF sense path configured to receive and process the RF sensing signal, the RF sense path comprising:
  a first chopper comprising a chopping switch, and configured to chop the RF signal at a first chopping frequency to generate a chopped signal;
  a demodulator coupled with a local oscillator (LO) generating a LO signal, the demodulator configured to mix the chopped signal with the LO signal to output a baseband signal; and
 a feedback loop configured to feed back the baseband signal to the gyro sensor, the feedback loop comprising:
  a connection path configured to connect the LO oscillator to the feedback loop, providing the LO signal as a first output test voltage;
  a chopper re-modulator configured to chop and modulate the baseband signal at a frequency of the LO signal to generate a modulated feedback signal;
  a first amplifier configured to amplify the modulated feedback signal; and
  a test voltage monitor configured to extract a component corresponding to the LO signal from the modulated feedback signal, and compare a voltage of the extracted component with an expected value determined based on a gain of the first amplifier.

2. The gyro sensor circuit according to claim 1, wherein the RF sense path further comprises a second amplifier configured to amplify the RF sensing signal.

3. The gyro sensor circuit according to claim 1, wherein the demodulator comprises:
 an RF section;
 an LO mixer configured to mix the chopped combination signal and LO signals to output a demodulated signal; and
 a baseband filter configured to receive the demodulated signal and pass a bandpass signal.

4. The gyro sensor circuit according to claim 1, wherein the feedback loop further comprises a third amplifier configured to amplify the baseband signal prior to the chopper re-modulator.

5. The gyro sensor circuit according to claim 4, wherein the RF sense path further comprises:
a fourth amplifier configured to amplify the baseband signal;
a second chopper configured to chop the amplified baseband signal at a second chopping frequency;
an analog-to-digital converter (ADC) configured to sample the amplified baseband signals for digitization.

6. The gyro sensor circuit according to claim 5, wherein the third amplifier and fourth amplifier are transconductance amplifiers.

7. The gyro sensor circuit according to claim 1, wherein the first amplifier is a transimpedance amplifier.

8. A gyro sensor circuit, comprising:
a gyro sensor generating an RF sensing signal according to an angular movement of the gyro sensor;
an RF sense path configured to receive and process the RF sensing signal, the RF sense path comprising:
a DC current generator configured to generate test DC current;
a first chopper configured to chop the DC current at a first chopping frequency and provide a chopped test DC current to the RF sense path, in which the chopped test DC current and the RF sensing signal are combined into a combination signal;
a first amplifier configured to amplify the combination signal;
a second chopper configured to chop the combination signal at a second chopping frequency to output a chopped combination signal; and
a demodulator comprising:
an RF section;
a test voltage monitor configured to extract a component corresponding to test DC current from the chopped combination signal, and compare a voltage of the extracted component with an expected value determined based on a gain of the first amplifier;
an LO mixer configured to mix the chopped combination signal and the LO signal to generate a modulated signal; and
a baseband filter configured to receive the modulated signal and pass a bandpass signal.

9. The gyro sensor circuit according to claim 8, wherein the first chopper and the second chopper are configured to conduct a chopping operation at a same chopping frequency.

10. The gyro sensor circuit according to claim 8, further comprising:
a feedback loop configured to feed back the baseband signal to the gyro sensor, the feedback loop comprising a chopper modulator configured to chop the baseband signal to output a modulated baseband signal.

11. The gyro sensor circuit according to claim 10, wherein the feedback loop further comprises, prior to the chopper modulator:
a second amplifier configured to amplify the baseband signal to output an amplified baseband signal.

12. The gyro sensor circuit according to claim 10, wherein the feedback loop further comprises a third amplifier configured to amplify the modulated baseband signal.

13. The gyro sensor circuit according to claim 12, wherein the RF sense path further comprises:
a fourth amplifier configured to amplify the baseband signal; and
an analog-to-digital converter (ADC) configured to sample the amplified baseband signals for digitization.

14. A gyro sensor circuit, comprising:
a gyro sensor generating an RF sensing signal according to an angular movement of the gyro sensor;
an RF sense path configured to receive and process the RF sensing signal, the RF sense path comprising:
a first chopper comprising a chopping switch, and configured to chop the RF signal at a first chopping frequency to generate a chopped signal;
a demodulator comprising:
an RF section;
a connection path configured to add an LO signal generated by an LO oscillator to the chopped RF signal, which produces a combination signal;
an LO mixer configured to mix the combination signal and the LO signal to generate a demodulated signal; and
a baseband filter configured to receive the demodulated signal and pass a bandpass signal; and
a feedback loop configured to feed back the baseband signal to the gyro sensor, the feedback loop comprising:
a first amplifier configured to amplify the baseband signal to output amplified baseband signal;
a test voltage monitor configured to extract a component corresponding to the LO signal from the modulated feedback signal, and compare a voltage of the extracted component with an expected value determined based on a gain of the first amplifier; and
a second chopper modulator configured to chop the baseband signal at a second chopping frequency to output a modulated baseband signal.

15. The gyro sensor circuit according to claim 14, wherein the RF sense path further comprises a second amplifier configured to amplify the RF sensing signal.

16. The gyro sensor circuit according to claim 14, wherein the RF sense path further comprises:
a third amplifier configured to amplify the baseband signal to output an amplified baseband signal;
a third chopper configured to chop the amplified baseband signal at a third chopping frequency; and
an analog-to-digital converter (ADC) configured to sample the amplified baseband signals to output a digitized baseband signal.

17. The gyro sensor circuit according to claim 16, wherein the RF sense path further comprises a digital signal processor (DSP) to analyze the digitized baseband signal.

18. The gyro sensor circuit according to claim 17, wherein the DSP comprises:
digital filters configured to extract the gyro desired signal as well as the test signal from the digitized baseband signal; and
an amplitude detector configured to measure the amplitude of the desired signals.

19. The gyro sensor circuit according to claim 14, wherein the feedback loop further comprises a fourth amplifier configured to amplify the modulated baseband signal.

20. The gyro sensor circuit according to claim 19, wherein the first and second amplifiers are transconductance amplifiers, and fourth amplifier is a transimpedance amplifier.

* * * * *